Oct. 19, 1965  R. L. DREYFUS ETAL  3,212,635

SPECIAL PACKAGE

Original Filed July 20, 1960

INVENTORS
ROBERT L. DREYFUS
WYLIE C. KIRKPATRICK

BY C.E. Parker
ATTORNEY

United States Patent Office 3,212,635
Patented Oct. 19, 1965

3,212,635
SPECIAL PACKAGE
Robert L. Dreyfus, Greenville, S.C., and Wylie C. Kirkpatrick, Greenwich, Conn., assignors to W. R. Grace & Co., Duncan, S.C., a corporation of Connecticut
Original application July 20, 1960, Ser. No. 44,196, now Patent No. 3,095,677, dated July 2, 1963. Divided and this application May 14, 1963, Ser. No. 280,464
2 Claims. (Cl. 206—65)

This application is a division of application Serial Number 44,196, filed July 20, 1960, now U.S. Patent 3,095,677, granted July 2, 1963.

This invention relates to packaging and more particularly to a novel method of packaging employing shrinkable material and to the package resulting therefrom.

Packaging of small inexpensive items has long posed a problem for the packaging industry. It is essential that packaging costs for such items to kept to an absolute minimum else the packaging cost may equal or exceed the value of the item being packaged. Because of the difficulty in lowering such packaging costs it is not uncommon to handle small items in unpackaged bulk quantities or as an alternative to package a number of the items in a single package. Both attempts to circumvent the heretofore high cost of packaging have not been satisfactory for obvious reasons. What is needed therefore is a low cost package which can be produced with a minimum of labor, machinery and materials.

Accordingly, it is an object of the present invention to provide a novel method of packaging employing shrinkable materials.

Another object is to provide a novel method of packaging which is suitable for small, low cost items.

It is a further object to provide a novel method for packaging small objects continuously in a continuous strip of material.

A further object is to provide a novel method of packaging small, irregular-shaped objects and also fragile and heat-sensitive objects.

Another object is to provide a package which is low in cost and suitable for small items.

Other and further objects, advantages and features of the present invention will become apparent to those skilled in the art from the following description taken in conjunction with the accompanying drawings in which.

Figure 1:
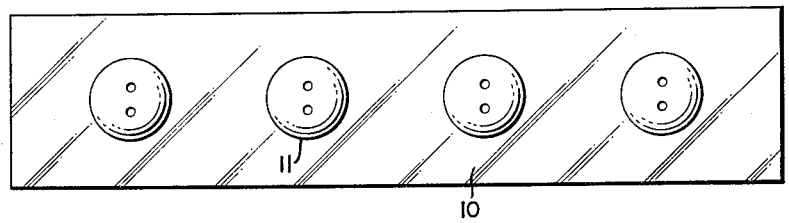
FIGURE 1 is a top plan view of a strip of shrinkable films having objects spaced at regular intervals upon said strip.

The plastic age has produced many new materials possessing properties that make them particularly useful in the field of packaging. One has only to look about to see the great use of transparent materials in packaging made possible by the development of inexpensive transparent materials. With the development of thermoplastics, it has become possible to mold containers in various shapes and styles. Shrinkable plastic materials have also made it possible to obtain skin-tight package coverings. This invention makes use of shrinkable materials in a novel manner to produce a novel package which solves a problem of long-standing in the industry.

The preferred shrinkable material and that used in the examples is a heat shrinkable, irradiated, biaxially oriented polyethylene film, specifically Alathon 14, average molecular weight 20,000, density 0.914 and having a melt index of 1.8 which has been irradiated to an extent of about 12 megarad and then biaxally stretched 350% in both a lateral and longitudinal direction. The irradiated, biaxially oriented polyethylene film has a shrink energy of about 150 p.s.i. in both directions at 96° C.

There may also be employed in this invention shrinkable irradiated polyethylene films which have been irradiated to an extent of 2 to 100 megarads, preferably 6 to 20 megarads. The irradiation may be accomplished in conventional fashion, e.g. by the use of electron beam generators such as the 2,000,000 volt General Electric resonant transformer unit, or high energy particle generators of 50,000 to 50,000,000 volts or a Van de Graaff electron generator such as that which operates at 2,000,000 volts with a power output of 500 watts, manufactured by the High Voltage Engineering Corp., Burlington, Mass. In addition to the use of electrons for irradiating the polyethylene there can be employed other sources of radiation which are capable of producing beta or gamma rays. There can be employed any of the irradiation procedures disclosed in Baird et al. application Serial No. 713,848, filed February 7, 1958 (now U.S. Patent 3,022,543), or Rainer Patent 2,877,500. The disclosures of the Baird et al. application and the Rainer patent are hereby incorporated by reference.

Orientation of the film may be accomplished by monoaxial or biaxial stretching. It is possible to stretch irradiated polyethylene from 100% to 700% longitudinally and from 100% to 900% laterally. Biaxial orientation results from the simultaneous radial and longitudinal stretching of the polyethylene. One method of biaxially orienting polyethylene is to force air into a heated tube of polyethylene forming a bubble which is trapped between two sets of pinch rolls. The tube of polyethylene undergoes a radial and longitudinal stretch to accommodate the air bubble. This process is described in more detail in the Baird et al. application Serial No. 713,848.

The biaxially oriented polyethylene prepared by the above procedures has a high shrink energy, e.g. 100 to 500 p.s.i. at 96° C. Shrink energy is the force of contraction at a given temperature when the material is restrained and more specifically it is the measurable tension in a fully monodirectionally restrained strip of film when heated to the specified temperature.

As a starting polyethylene there may be employed high, medium or low density polyethylene prepared by high or low pressure techniques and having molecular weights from 7000 to 35,000 or even higher.

In place of irradiated polyethylene there can also be employed in my invention irradiated, solid copolymers of ethylene and propylene (e.g., a 50–50 copolymer) or irradiated solid copolymers of ethylene with a minor amount, e.g. 5% of isobutylene, amylene, acetylene, butadiene, butene-1 and butene-2, or irradiated blends of low density polyethylene with from 25 to 90% by weight of a copolymer of ethylene and from 0.5 to 15% by weight of another olefin which has 3 to 18 carbon atoms, or block copolymers of polyethylene with a minor amount, e.g., 5% of polyisobutylene, and irradiated graft polymers of polyethylene or polypropylene with monomers such as acetylene, butadiene, butylene, ethylene or polypropylene which materials are biaxially oriented. There can also be employed solid polypropylene and polyvinyl chloride which are biaxially oriented. It is possible to employ other film materials having a high degree of shrink and which do not decompose or melt under the temperature required to shrink such materials.

Referring now more particularly to FIGURE 1, the numeral 10 refers to a strip of irradiated, biaxially oriented polyethylene film which is approximately 1 mil thick 6 inches wide and 24 inches long. The strip of film is placed upon a suitable flat supporting surface not shown in the drawings. There is placed upon the film strip a plurality of small rounded objects approximately 1 inch in diameter and ¼ inch in height, e.g. buttons. The objects are spaced along the center of the film strip approximately 4 inches apart and from 4 to 6 inches from either end of the film strip.

A hot air blower capable of generating a gas temperature of approximately 300 to 750° F. is placed above the strip of film and the hot air is directed against the top surface of the film bearing the objects. Starting at one end of the film strip the jet of hot air is moved along the film strip at a speed which will permit the exposed surface of the film to be almost completely shrunk.

Figure 2:
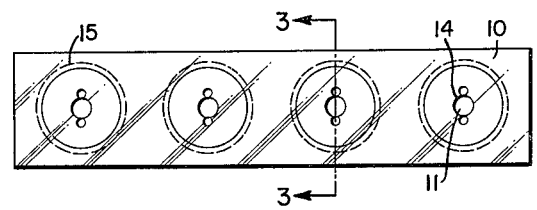
FIGURE 2 is a top plan view of the strip showing the film in its shrunken state and the objects enclosed within the shrunken film strip.
Figure 3:
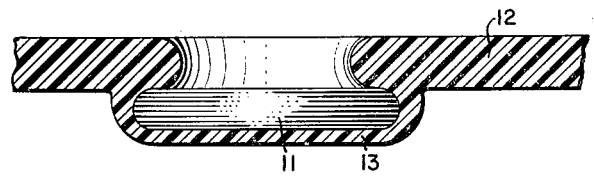
FIGURE 3 is a partial cross-sectional view of FIGURE 2 along the line 3—3.

In the present example the film will shrink approximately 75% of its original dimensions. As the film shrinks it will be observed that the film in the immediate vicinity of the objects curls over and around each object, thereby partially encapsulating the object within the strip of film. The shrunken strip of film with the partially encapsulated objects is shown in FIGURE 2 wherein 14 refers to the area over the object 11 which is not covered by the film and 15 refers to the outline of the unshrunk film pocket surrounding the object. The shrunken film is now approximately 15 mils thick. FIGURE 3 shows in detail the manner in which the thickened shrunk film has partially closed over the object and also shows the unshrunk portion of the film 13 directly under the object which is substantially uniform in guage of thickness and has retained its original thickness of 1 mil.

The above procedure permits the packaging of objects in a transparent strip of plastic material by merely placing the objects to be packaged upon a strip of shrinkable film and then applying heat. The application of heat is sufficient to cause the object to be encapsulated within the shrunken film. No wrapping step is required to bring the film over the object.

This invention also contemplates the continuous encapsulation of objects within a strip of material. For example, a polyethylene film strip could be continually dispensed from a roll toward a pull roll system or onto a moving conveyor, whereupon the products to be packaged would be automatically placed upon the strip of film and moved towards a heat source which would shrink the film and encapsulate the product. The packaged product could then be taken up on rolls or cut in lengths or handled in any manner desired. In employing such a continuous or automatic procedure it is possible and might be desirable to indent the objects into the film prior to its being shrunk in order to insure more uniform and precise encapsulation. This could be accomplished by placing the object on the film with some degree of force while the film is above a resilient base. Another method of insuring a more uniform encapsulation would be to employ a conveyor belt having a series of pockets spaced along the belt. As the film moves along the belt the object being packaged is placed upon the film so as to fit into the pocket. The object is held securely in place through the shrinking operation. It might also be necessary in certain cases to provide a more uniform and attractive end product to employ guides to prevent the film edges from curling while exposed to heat.

While a hot air gun is an obvious source of heat for shrinking the film, it is obvious that other heat sources could be employed and that any temperature that is high enough to shrink the film without melting or decomposing the film will be satisfactory.

There are many possible alternative methods of merchandising objects packaged according to this invention. The packaged product could be wound on rolls and the desired quantity could be cut off in a continuous strip. It is also possible to cut the packaged product into strips of different sizes or even into individual units. The thickened film is sufficiently sturdy so that the strips may be displayed by hanging from some suitable support. The resulting package is sturdy, transparent and attractive.

The invention is particularly suitable for packaging objects which have relatively flat regular shapes and are not sensitive to the temperatures employed in shrinking the film. Thus there may be packaged such objects as buttons, coins, washers, medals, chips, tablets, pills, discs, etc. It is necessary that the object be sufficiently rigid so as not to deform under the strain of the shrinking film. This invention is not limited, however, to objects having rounded shapes but also applies to objects having other geometric configurations, e.g. rectangles, triangles, etc. With the shrinkable materials disclosed in this application, it is possible to encapsulate objects up to ½ inch in thickness.

Taller and thicker objects than the aforementioned can be suitably partially encapsulated or held to a film strip if such objects have a relatively thin extension, projection or flange at the base thereof over which the film may curl when shrinking, e.g., transformers or other small electrical parts which have thin lateral projections which serve to retain fastening devices.

By modifying the above-described encapsulation process it becomes possible to encapsulate delicate, heat-sensitive or irregular-shaped objects. Flat forms, e.g. metal washers, are placed upon a strip of irradiated, biaxially oriented polyethylene film which is shrunk by the application of heat in the manner heretofore described. The forms are easily removed from their pockets within the shrunken film because of the resiliency and elasticity of the film. The delicate, heat sensitive, irregular shaped or any other object of suitable size may then be placed within the pockets of unshrunken film which will then hold the object. If a tighter pocket is desired, heat may be applied to the unshrunk pocket causing it to shrink and tighten about the object contained therein.

Figure 4:
FIGURE 4 is an elevational view partially in section showing the formation of a pocket in a strip of film and the packaging of an irregularly shaped object in said pocket.

FIGURE 4 discloses a strip of irradiated, biaxially oriented polyethylene film 20 which has been shrunk about flat round forms 21 and from which the forms have been removed leaving empty pockets 22 of unshrunk film. There have been placed in several of the empty unshrunk pockets objects 23, such as brass screws, which are retained therein because of the narrow opening of the pocket. If desired the unshrunk pocket may be shrunk about the enclosed brass screw by the application of heat.

The invention described in detail in the foregoing specification is susceptible to changes and modifications as may occur to persons skilled in the art without departing from the principle and spirit thereof. The terminology used in the specification is for purpose of description and not of limitation, the scope of the invention being defined in the claims.

We claim:

1. A package comprising a strip of shrunken film containing at least one pocket of unshrunken film integral with said strip and extending below and strip, and having an object partially enclosed within said pocket by the shrunken film at the edge of the pocket being curled over the upper edge of said object.

2. The package of claim 1 within said strip contains a plurality of pockets.

References Cited by the Examiner

UNITED STATES PATENTS

| | | | |
|---|---|---|---|
| 2,491,423 | 12/49 | Snyder | 206—78 |
| 2,861,405 | 11/58 | Hanford | 206—78 |
| 2,903,139 | 9/59 | Penman. | |
| 2,975,931 | 3/61 | Harrison. | |
| 3,034,271 | 3/62 | Carpenter. | |
| 3,060,655 | 10/62 | Dreyfus. | |
| 3,095,084 | 6/63 | White | 206—83 |

LOUIS G. MANCENE, *Primary Examiner.*

THERON E. CONDON, *Examiner.*